(12) United States Patent
Collins

(10) Patent No.: US 11,993,262 B2
(45) Date of Patent: May 28, 2024

(54) CRAWL OPERATIONS FOR FOUR-WHEEL STEERING VEHICLES

(71) Applicant: Ford Global Technologies, LLC, Dearborn, MI (US)

(72) Inventor: Patrick Gordon Collins, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 849 days.

(21) Appl. No.: 17/039,224

(22) Filed: Sep. 30, 2020

(65) Prior Publication Data
US 2022/0097704 A1   Mar. 31, 2022

(51) Int. Cl.
*B60K 1/02*       (2006.01)
*B60K 17/34*      (2006.01)
(Continued)

(52) U.S. Cl.
CPC ......... *B60W 30/18063* (2013.01); *B60K 1/02* (2013.01); *B60K 17/348* (2013.01);
(Continued)

(58) Field of Classification Search
CPC .. B62D 7/1509; B62D 7/1518; B62D 7/1581; B62D 7/1554; B62D 7/142;
(Continued)

(56) References Cited

U.S. PATENT DOCUMENTS 6,546,323 B2    4/2003  Deguchi et al.
7,617,881 B2 *  11/2009 Radke ................ B62D 33/0617
                                                      172/810
(Continued)

FOREIGN PATENT DOCUMENTS

CN        202174937 U  *  3/2012  ............. B60K 17/14
CN        105425699 A  *  3/2016
(Continued)

OTHER PUBLICATIONS

Stajnko, D., et al. "The influence of different steering systems on a wheel slip." Journal of Achievements in Materials and Manufacturing Engineering 55.2 (2012): 817-824. (Year: 2012).*

(Continued)

*Primary Examiner* — Cuong H Nguyen
(74) *Attorney, Agent, or Firm* — Lorne Forsythe; Hanley, Flight & Zimmerman, LLC

(57) ABSTRACT

Crawl operations for four-wheel steering vehicles are described herein. An example vehicle described herein includes four wheels, a front steering actuator to turn the front wheels, a rear steering actuator to turn the rear wheels, a front drive motor to drive the front wheels, and a rear drive motor to drive the rear wheels. The vehicle also includes an electronic control unit (ECU) to activate the front steering actuator to turn the front wheels in a first direction, activate the rear steering actuator to turn the rear wheels in a second direction opposite the first direction such that the front wheels and the rear wheels are turned in opposite directions, activate the front drive motor to drive the front wheels in a reverse direction, and activate the rear drive motor to drive the rear wheels in a forward direction while the front wheels are driven in the reverse direction.

20 Claims, 8 Drawing Sheets

(51) Int. Cl.
| | |
|---|---|
| *B60K 17/348* | (2006.01) |
| *B60K 17/356* | (2006.01) |
| *B60W 30/18* | (2012.01) |
| *B62D 5/00* | (2006.01) |
| *B62D 7/15* | (2006.01) |

(52) U.S. Cl.
CPC .......... *B60K 17/356* (2013.01); *B60K 17/358* (2013.01); *B62D 5/00* (2013.01); *B62D 7/1509* (2013.01); *B62D 7/1581* (2013.01); *B62D 7/159* (2013.01)

(58) Field of Classification Search
CPC ... B60W 30/18063; B60K 1/02; B60K 17/34; B60K 17/17348; B60K 17/354; B60K 17/356
USPC .................................................. 180/409–412
See application file for complete search history.

(56) References Cited

U.S. PATENT DOCUMENTS

| | | | | |
|---|---|---|---|---|
| 7,771,314 | B2* | 8/2010 | Eguchi ................ | B60W 10/184 477/109 |
| 7,849,945 | B2 | 12/2010 | Ross, VII et al. | |
| 7,942,604 | B2* | 5/2011 | Willis .................... | B62D 7/026 404/85 |
| 8,240,423 | B2* | 8/2012 | Scherbring .............. | B62D 5/06 180/408 |
| 8,430,192 | B2 | 4/2013 | Gillett | |
| 9,085,302 | B2* | 7/2015 | Borroni-Bird .......... | B60T 13/74 |
| 9,254,866 | B2* | 2/2016 | Dawson ................. | B60K 17/30 |
| 9,321,482 | B2* | 4/2016 | Morikawa ................ | B62D 7/09 |
| 10,245,937 | B2* | 4/2019 | Gillett .................... | B62K 17/00 |
| 2008/0185211 | A1* | 8/2008 | Akashima .............. | B62D 25/10 180/367 |
| 2011/0162896 | A1* | 7/2011 | Gillett ..................... | B60L 8/006 180/2.2 |
| 2012/0018275 | A1* | 1/2012 | Voth ........................ | F16D 11/10 192/30 R |
| 2014/0038763 | A1* | 2/2014 | Knickerbocker ...... | B60K 17/26 475/221 |
| 2015/0014952 | A1* | 1/2015 | Morikawa ................ | B62D 7/09 280/91.1 |
| 2015/0083509 | A1* | 3/2015 | Borroni-Bird ........ | B60W 10/08 180/204 |
| 2017/0190335 | A1* | 7/2017 | Gillett .................... | A63C 17/12 |
| 2018/0281878 | A1* | 10/2018 | Aoki .................... | B62D 55/116 |
| 2019/0375453 | A1 | 12/2019 | Buchwitz et al. | |

FOREIGN PATENT DOCUMENTS

| | | | | |
|---|---|---|---|---|
| CN | 107200054 A | * | 9/2017 | ............. B60K 26/02 |
| CN | 107878170 A | * | 4/2018 | ........... B60B 35/122 |
| CN | 110329072 A | * | 10/2019 | ............. B60K 35/00 |
| CN | 108474362 B | * | 10/2020 | ................ E02F 9/22 |
| DE | 10304796 A1 | * | 8/2004 | ........... B62D 7/1509 |
| DE | 112010003322 B4 | * | 1/2020 | ........... B60W 40/107 |
| JP | H10218004 A | * | 8/1990 | ............. Y02P 60/14 |
| JP | 2006306205 A | | 11/2006 | |
| JP | 2020174537 A | * | 10/2020 | ............. A01D 41/12 |
| WO | WO-2017169324 A1 | * | 10/2017 | ............ B60W 10/02 |
| WO | 2019229205 A1 | | 12/2019 | |

OTHER PUBLICATIONS

Xu, F. X., Zhou, C., & Liu, X. H. (2022). Hierarchical control strategies for multi-mode steering system of emergency rescue vehicle. Mechatronics, 85, 102834. (Year: 2022).*

Alexandru, C. (2017). A mechanical integral steering system for increasing the stability and handling of motor vehicles. Proceedings of the Institution of Mechanical Engineers, Part C: Journal of Mechanical Engineering Science, 231(8), 1465-1480. (Year: 2017).*

Dawson, A.D., Bluethmann, W.J., Lee, C.J., Vitale, R.L., Guo, R. and Atluri, V.P., 2016. Method of Controlling Steering of a Ground Vehicle (U.S. Pat. No. 9,254,866—Feb. 9, 2016). (Year: 2016).*

Feng, Chun-Kui, translated version for CN 105425699 A (Year: 2016).*

Shu et al, translated version for CN 107878170 A (Year: 2016).*

IRJET: Developing a System for Reducing the Turning Radius of a Car (Year: 2019).*

Xu, Fei-xiang, Chen Zhou, and Xin-hui Liu. "Hierarchical control strategies for multi-mode steering system of emergency rescue vehicle." Mechatronics 85 (2022): 102834.(Year:2022).*

"Independent wheel control system design for highly automated driving" by Li et al (Mar. 2021).*

Qi, Lingfei, et al. "A novel terrain adaptive omni-directional unmanned ground vehicle for underground space emergency: Design, modeling and tests." Sustainable Cities and Society 65 (2021): 102621. (Year: 2021).*

Capparella, "GMC Shows Hummer EV's Crab Mode, Confirms Oct. 2020 Reveal," Car and Driver, Sep. 14, 2020, 6 pages.

Rivian, "Tank Turn | Electric Adventure Vehicles | Rivian," Youtube, Dec. 25, 2019. Retrieved from the Internet: https://www.youtube.com/watch?v=yzwM8KE2L3I.

* cited by examiner

CRAWL OPERATIONS FOR FOUR-WHEEL STEERING VEHICLES

FIELD OF THE DISCLOSURE

This disclosure relates generally to vehicles and, more particularly, to crawl operations for four-wheel steering vehicles.

BACKGROUND

Vehicles, such as cars and trucks, often get stuck because of adverse conditions on the ground, such as snow, sand, mud, ruts, etc. These adverse conditions cause the vehicle tires to lose traction. As a result, the vehicle cannot drive forward or reverse and becomes stuck.

SUMMARY

Disclosed herein is example vehicle including a left front wheel, a right front wheel, a left rear wheel, and a right rear wheel. The vehicle also includes a front steering actuator to turn the left and right front wheels, a rear steering actuator to turn the left and right rear wheels, a front drive motor to drive the left and right front wheels, and a rear drive motor to drive the left and right rear wheels. The vehicle further includes an electronic control unit (ECU) to activate the front steering actuator to turn the left and right front wheels in a first direction, activate the rear steering actuator to turn the left and right rear wheels in a second direction opposite the first direction such that the left and right front wheels and the left and right rear wheels are turned in opposite directions, activate the front drive motor to drive the left and right front wheels in a reverse direction, and activate the rear drive motor to drive the left and right rear wheels in a forward direction while the left and right front wheels are driven in the reverse direction.

Disclosed herein is an example non-transitory machine readable medium including instructions that, when executed, cause an electronic control unit (ECU) of a vehicle to activate a front steering actuator of the vehicle to turn front wheels of the vehicle in a first direction, activate a rear steering actuator of the vehicle to turn rear wheels of the vehicle a second direction opposite the first direction such that the front wheels and the rear wheels are turned in opposite directions, activate a front drive motor to drive the front wheels in a reverse direction, and activate a rear drive motor to drive the rear wheels in a forward direction while the front wheels are driven in the reverse direction.

Disclosed herein is an example vehicle including a left front wheel, a right front wheel, a left rear wheel, and a right rear wheel. The vehicle also includes a left front steering actuator to turn the left front wheel, a right front steering actuator to turn the right front wheel, a left rear steering actuator to turn the left rear wheel, a right rear steering actuator to turn the right rear wheel, a front drive motor to drive the left and right front wheels, and a rear drive motor to drive the left and right rear wheels. The vehicle further includes an electronic control unit (ECU) to activate the left front steering actuator and the left rear steering actuator to turn the left front wheel and the left rear wheel, respectively, in a first direction, activate the right front steering actuator and the right rear steering actuator to turn the right front wheel and the right rear wheel, respectively, in a second direction while the left front wheel and the left rear wheel are turned in the first direction, and activate the front drive motor and the rear drive motor to drive the left and right front wheels and the left and right rear wheels, respectively, in a same direction.

BRIEF DESCRIPTION OF THE DRAWINGS

The figures are not to scale. In general, the same reference numbers will be used throughout the drawing(s) and accompanying written description to refer to the same or like parts.

Figure 1:
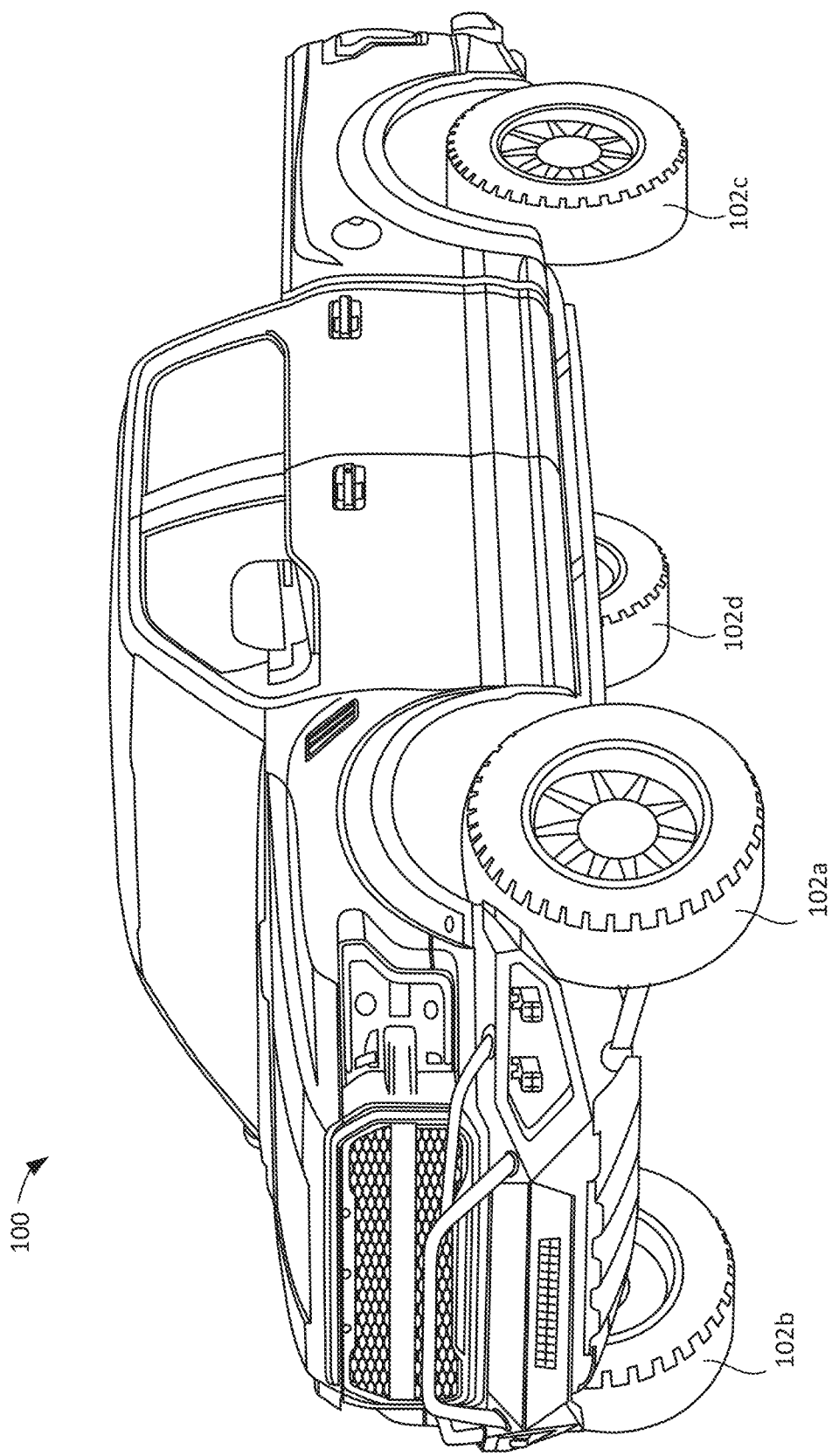
FIG. 1 illustrates an example vehicle in which the examples disclosed herein can be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Four-wheel vehicles, such as cars or trucks, can become stuck in adverse ground conditions, such as snow, sand, mud, ruts, etc. In particular, these adverse ground conditions cause the wheels (tires) of the vehicle to lose traction with the ground. As a result, one or more (or sometimes all) of the wheels slip and, thus, the vehicle cannot be driven forward or backwards.

Many vehicles today have four-wheel steering capabilities. In a four-wheel steering vehicle, the rear wheels can be turned in the same direction or opposite direction as the front wheels. This helps with maneuverability, which is especially advantageous with larger vehicles like trucks. Four-wheel steering can be implemented on electric drive-by-wire vehicles. In such vehicles, the front wheels are turned or steered by a front steering actuator and the rear wheels are turned or steered by a rear steering actuator. Additionally, the front wheels can be driven by a front drive motor and the rear wheels can be driven by a separate rear drive motor.

Example methods, systems, apparatus, and articles of manufacture are disclosed herein that leverage the four-wheel steering capabilities of a vehicle to help free the vehicle from being immobilized (e.g., stuck) by an adverse ground condition. The examples disclosed herein are directed to a vehicle with an electronic control unit (ECU) having a crawl mode controller that can execute a set (e.g., a sequence or series) of instructions to steer and drive the wheels in a manner that can move the vehicle sideways, forward, or backward. The instruction(s) can be implemented as part of a crawl operation. As used herein, the term "crawl" refers to slow, high torque rotations of the wheels that move the vehicle. As disclosed in further detail herein, the ECU can be used to implement a left crawl operation that moves the vehicle sideways to the left, a right crawl operation that moves the vehicle sideways to the right, a forward crawl operation that moves the vehicle forward, or a reverse crawl operation that moves the vehicle backward or in a reverse direction.

In an example left crawl operation disclosed herein, the front wheels are turned to the right and the rear wheels are turned to the left, such that the front wheels and the rear wheels are turned in opposite directions. As used herein, the terms turn, steer, and rotate may be used interchangeably to refer to the steering of the wheels. Then, the front wheels are driven in the reverse direction while the rear wheels are driven in the forward direction. The reverse direction force from the front wheels and the forward direction force from the rear wheels counters or cancels out. However, because all of the wheels are turned, a net positive force is produced in the left direction. This net positive force drives or moves the vehicle laterally to the left, without moving the vehicle forward or reverse. Additionally, because all of the wheels are turned, the wheels can contact the surrounding ground (e.g., walls of a rut) for more traction and/or move some of the surrounding ground beneath the wheels, which further improves the traction of the vehicle. This enables the vehicle to traverse laterally or sideways out of the current adverse condition (e.g., out of a rut, out of a muddy patch, off of a patch of ice, etc.) and to a location where there is more traction. In an example right crawl operation disclosed herein, a similar process occurs but the front wheels are turned to the left and the rear wheels are turn to the right. This results in a net positive force to the right, which drives or moves the vehicle laterally to the right.

The examples disclosed herein also include a forward and reverse crawl operation. In an example forward crawl operation, the left front and rear wheels of the vehicle are turned to the right and the right front and rear wheels of the vehicle are turned to the left. Then, all of the wheels are driven in the forward direction. The left and right forces from the wheels counter or cancel out. However, because all of the wheels are driven forward, a net positive force is produced in the forward direction. This net positive force drives or moves the vehicle in a forward direction, without turning the vehicle to the left or right. Additionally, because all of the wheels are turned, the wheels can contact the surrounding ground (e.g., walls of a rut) for more traction and/or move some of the surrounding ground beneath the wheels, which further improves the traction of the vehicle. This enables the vehicle to move forward out of the current adverse condition (e.g., out of a rut, out of a muddy patch, off of a patch of ice, etc.) and to a location where there is more traction. In an example reverse crawl operation disclosed herein, a similar process occurs but the left wheels are turned to the left, the right wheels are turned to the right, and all of the wheels are driven in the reverse direction. This results in a net positive force in the reverse direction, which drives or moves the vehicle backward or in the rearward direction. This type of movement generated by the wheels during the left, right, forward, and reverse crawl operations may be considered screw propulsion.

In some examples, the ECU automatically performs a crawl operation in response to a request from a driver (or another person). For example, the driver may press a button or enter a command into a user interface (e.g., a screen) in the cabin of the vehicle for the ECU to perform a left crawl operation, a right crawl operation, a forward crawl operation, or a reverse crawl operation. The ECU then activates the steering actuators and drive motors to perform the selected operation. In some examples, the ECU modulates (e.g., increases or decreases) power to the front and/or rear driving motors to limit (e.g., prevent or reduce the likelihood of) rotation of the vehicle. In some examples, the ECU continues to drive the wheels until the driver enters a cancel command. For example, the driver may sit in the vehicle and wait while the vehicle moves. When the driver determines the vehicle has moved far enough to a location where there is more traction, the driver can cancel or deactivate the operation. Additionally or alternatively, the ECU may continue to drive the wheels until the ECU determines the wheels have gained sufficient traction (e.g., based on measurements from one or more wheel torque sensors). In another example, the ECU may continue to drive the wheels until the vehicle has moved a certain distance (e.g., 5 feet) from its original location, such that the vehicle is likely in a location with more traction. When the ECU cancels or deactivates the operation, the ECU stops driving the wheels and returns the wheels to their middle or neutral position, at which point the vehicle can resume a normal driving mode. In other examples disclosed herein, the ECU enables the driver to control the steering of the wheels and/or power applied to the wheels.

In some examples disclosed herein, the vehicle includes two steering actuators including a front steering actuator for steering the front wheels and a rear steering actuator for steering the rear wheels. In other examples, the vehicle includes four steering actuators, one for each wheel, such that each wheel can be independently steered. In some examples disclosed herein, the vehicle includes two drive motors (e.g., electric motors) including a front drive motor for driving (e.g., powering) the front wheels and a rear drive motor for driving the rear wheels. In other examples, the vehicle can include four drive motors, one for each wheel, such that each wheel can be independently driven. As used herein, the directions left and right are relative to a seated position in the vehicle and looking forward.

Turning now to the figures, FIG. 1 illustrates an example vehicle 100 in which the examples disclosed herein can be implemented. The vehicle 100 includes a left front wheel 102*a*, a right front wheel 102*b*, a left rear wheel 102*c*, and a right rear wheel 102*d*. The vehicle 100 has four-wheel steering capabilities, as disclosed in further detail herein. In this example, the vehicle 100 is depicted as a pick-up truck. However, the example vehicle 100 can be implemented as any type of four-wheeled vehicle, such as a car, a van, a dune-buggy, a recreational vehicle (RV), an all-terrain-vehicle (ATV), etc.

Figure 2:
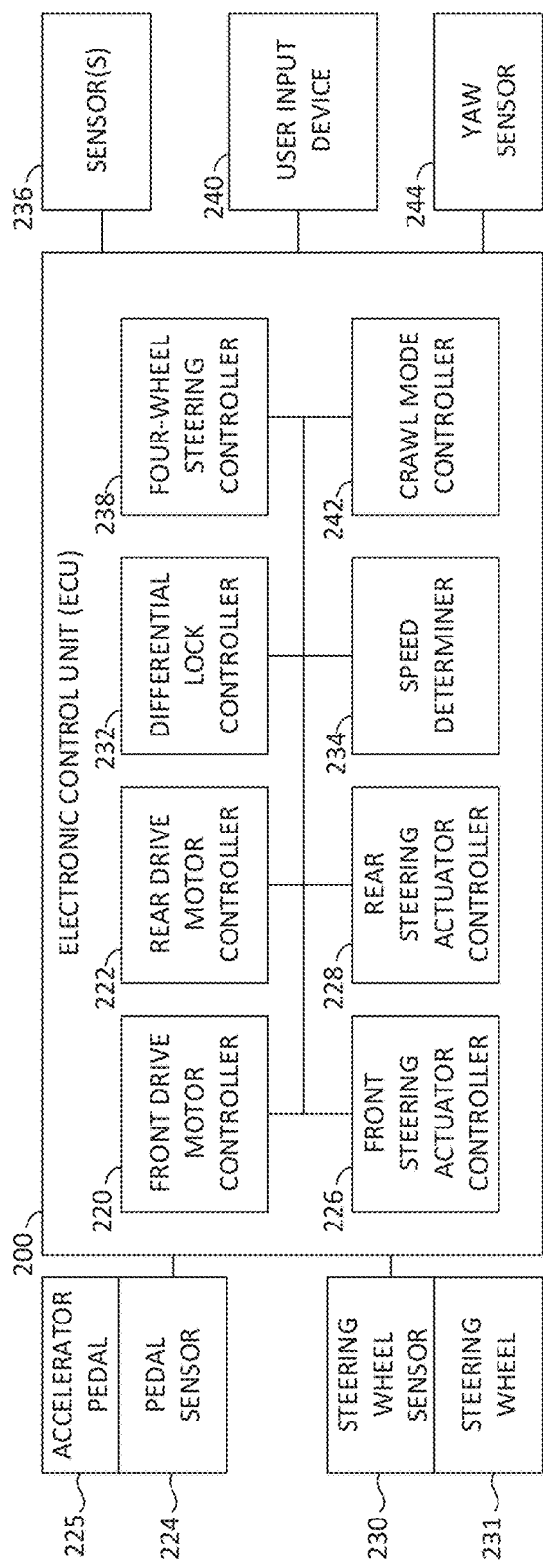
FIG. 2 illustrates a top view of the example vehicle of FIG. 1 and an example electronic control unit (ECU) implemented in connection with the vehicle.
Figure 2:
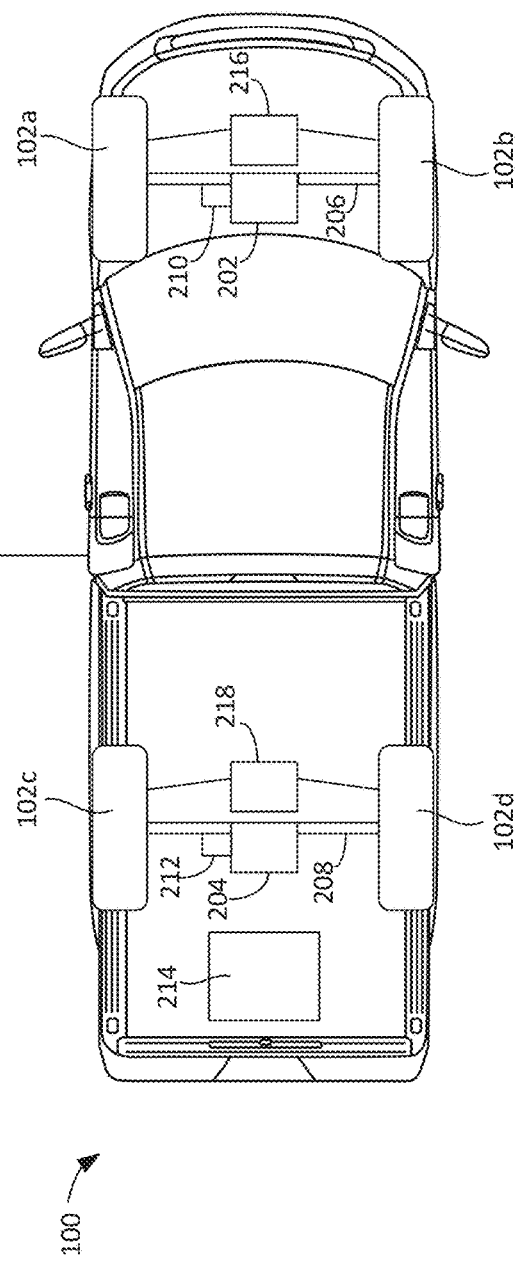

FIG. 2 shows a top view of the vehicle 100 including a number of steering and drive components of the vehicle 100. FIG. 2 also shows a block diagram of an electronic control unit (ECU) 200, that is implemented in the vehicle 100 and that controls various components of the vehicle 100.

In this example, the vehicle 100 is an electric vehicle that includes one or more electric motors to drive the wheels 102a-102d. For example, the vehicle 100 includes a front drive motor 202 (e.g., a first electric motor) to drive the left and right front wheels 102a, 102b, and a rear drive motor 204 (e.g., a second electric motor) to drive the left and right rear wheels 102c, 102d. The front drive motor 202 can drive the left and right front wheels 102a, 102b in a forward direction or a reverse direction. The front drive motor 202 transfers power to the left and right front wheels 102a, 102b via a front differential 206. Similarly, the rear drive motor 204 can drive the left and right rear wheels 102c, 102d in the forward direction or reverse direction and transfers power to the left and right rear wheels 102c, 102d via a rear differential 208. In other examples, the vehicle 100 can include separate drive motors for each of the wheels 102a-102d, such that each of the wheels 102a-102d can be independently driven. In the illustrated example, the vehicle 100 includes a front differential lock 210 for locking the front differential 206 (such that the left and right front wheels 102a, 102b rotate at the same speed) and a rear differential lock 212 for locking the rear differential 208 (such that the left and right rear wheels 102c, 102d rotate at the same speed). The vehicle 100 includes a battery 214 (e.g., a lithium ion battery) to power the front and rear drive motors 202, 204 as well as other electrical components of the vehicle 100.

Figure 5A:
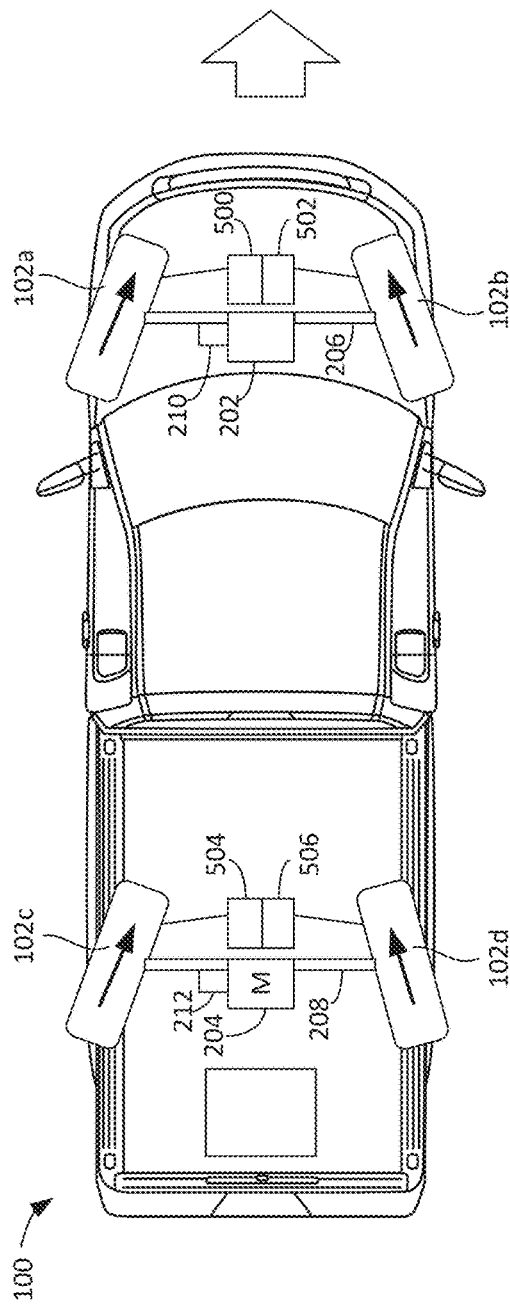
FIG. 5A shows an example orientation and driving direction of the wheels of the example vehicle of FIGS. 1 and 2 during an example forward crawl operation disclosed herein.
Figure 5B:
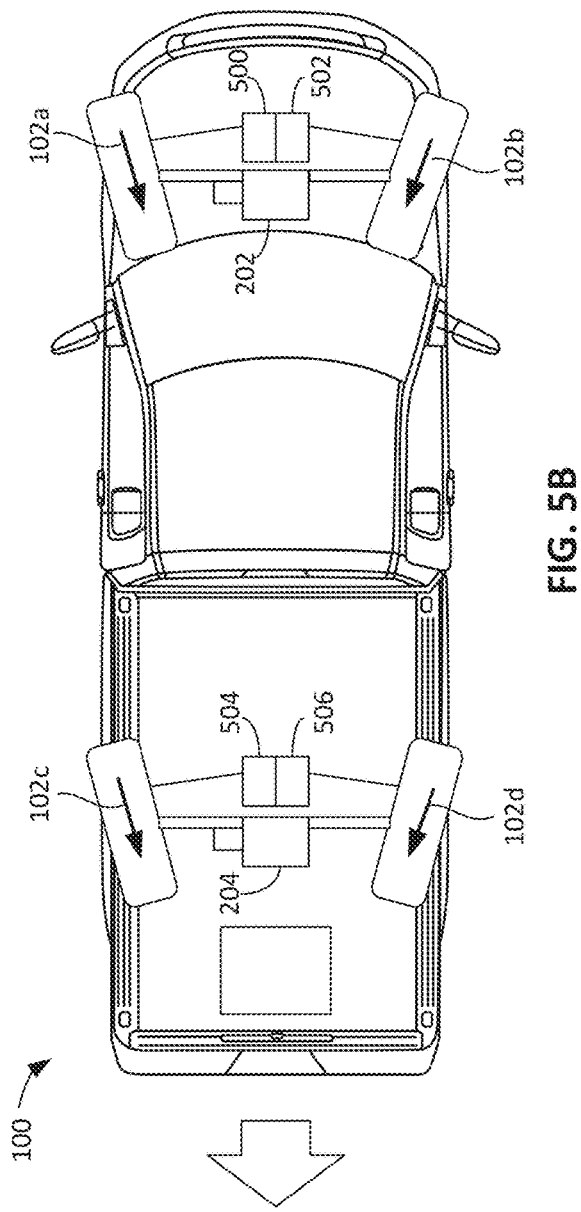
FIG. 5B shows an example orientation and driving direction of the wheels of the example vehicle of FIGS. 1 and 2 during an example reverse crawl operation disclosed herein.

The vehicle 100 includes four-wheel steering. In the illustrated example, the vehicle 100 includes a front steering actuator 216 for steering the left and right front wheels 102a, 102b, and a rear steering actuator 218 for steering the left and right rear wheels 102c, 102d. In this example, the front steering actuator 216 operates to turn the left and right front wheels 102a, 102b simultaneously in the same direction. Similarly, the rear steering actuator 218 operates to turn the left and right rear wheels 102c, 102d simultaneously in the same direction. The rear steering actuator 218 can be operated to turn the left and right rear wheels 102c, 102d in the same direction or opposite direction as the left and right front wheels 102, 102b, as disclosed in further detail herein. In other examples, such as shown in FIGS. 5A and 5B and disclosed in further detail herein, the vehicle 100 may include separate steering actuators for each of the wheels 102a, 102d such that each of the wheels 102a-102d can be independently steered.

In the illustrated example, the ECU 200 includes a front drive motor controller 220 that controls the front drive motor 202. The front drive motor controller 220 can activate the front drive motor 202 to drive the left and right front wheels 102a, 102b in the forward direction or reverse direction as well as control the speed of rotation of the left and right front wheels 102a, 102b. The ECU 200 includes a rear drive motor controller 222 that controls the rear drive motor 204. The rear drive motor controller 222 can activate the rear drive motor 204 to drive the rear wheels 102c, 102d in the forward direction or reverse direction as well as control the speed of rotation of the left and right rear wheels 102c, 102d.

During the normal driving mode, the front and rear drive motor controllers 220, 222 control the speed of the wheels 102a-102d based on input from a pedal sensor 224 that measures the position of an accelerator pedal 225.

In the illustrated example, the ECU 200 includes a front steering actuator controller 226 that controls the front steering actuator 216. The front steering actuator controller 226 can activate the front steering actuator 216 to turn or steer the left and right front wheels 102a, 102b to the left or the right by any degree or angle within a turning limit range (e.g., ±30°). The ECU 200 includes a rear steering actuator controller 228 that controls the rear steering actuator 218. The rear steering actuator controller 228 can activate the rear steering actuator 228 to turn or steer the left and right rear wheels 102c, 102d to the left or the right by any degree or angle within a turning limit range (e.g., ±30°). During normal driving mode, the front and/or rear steering actuator controllers 226, 228 control the front and rear steering actuators 216, 218, respectively, based on input from a steering wheel sensor 230 that measures the angle of a steering wheel 231.

In the illustrated example, the ECU 200 includes a differential lock controller 232 that controls (e.g., activates or deactivates) the front and rear differential locks 210, 212. In the illustrated example, the ECU 200 includes a speed determiner 234 that determines the speed of the vehicle 100. The speed determiner 234 can determine the speed of the vehicle 100 based on input from one or more sensor(s) 236. The sensor(s) 236 can include wheel speed sensors that are associated with each of the wheels 102a-102d, a global positioning system (GPS) receiver, and/or a camera.

In the illustrated example, the ECU 200 includes a four-wheel steering controller 238 that is configured to switch the vehicle 100 between a two-wheel steering mode in which only the front wheels 102a, 102b turn to steer the vehicle 100 and a four-wheel steering mode in which all four wheels 102a-102d turn to steer the vehicle 100. In some examples, the four-wheel steering controller 238 switches between the two and four-wheel steering modes in response to a command from a user input device 240. The user input device 240 may be, for example, a button, a switch, and/or a screen (e.g., a touchscreen display) in the cabin of the vehicle 100. The driver (or another person) may interact with the user input device 240 to switch between the two modes.

In the four-wheel steering mode, the rear steering actuator control 228 may be configured to control the rear steering actuator 218 to turn the left and right rear wheels 102c, 102d in the same direction as the left and right front wheels 102a, 102b or the opposite direction as the left and right front wheels 102, 102b. In some examples, the decision to turn the rear wheels 102c, 102d in the same direction or opposite direction as the front wheels 102a, 102b depends on the speed of the vehicle 100. For example, during slower speeds, the rear wheels 102c, 102d may be turned in the opposite direction as the front wheels 102a, 102b to enable a tighter turning radius. However, during higher speeds, the rear wheels 102c, 102d may be turned in the same direction as the front wheels 102a, 102b, which improves stability of the vehicle 100 at higher speeds.

Figure 3A:
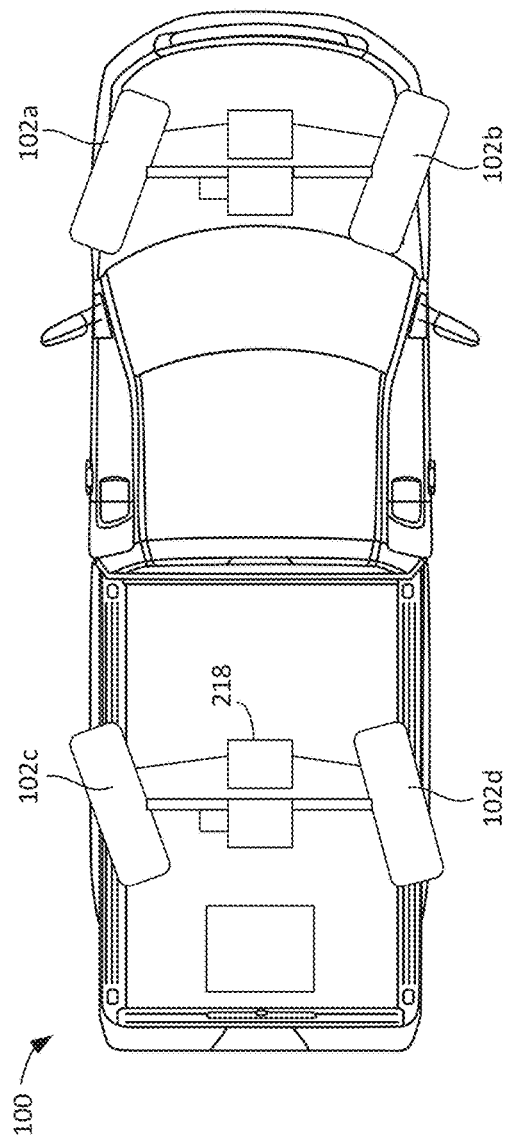
FIG. 3A shows an example orientation of the wheels of the example vehicle of FIGS. 1 and 2 at slower speeds in a four-wheel steering mode.

For example, FIG. 3A shows an example in which the rear steering actuator controller 228 (FIG. 2) activates the rear steering controller 218 to turn the rear wheels 102c, 102d in the opposite direction as the front wheels 102a, 102b. For example, if the driver turns the steering wheel 231 (FIG. 2) to the right, the front wheels 102a, 102b are turned to the right and the rear wheels 102c, 102d are turned to the left, which is shown in FIG. 3A. Conversely, if the driver turns the steering wheel 231 to the left, the front wheels 102a, 102b are turned to the left and the rear wheels 102c, 102d are turned to the right. This improve maneuverability and enables the vehicle 100 to make sharper turns, which is advantageous (especially for larger vehicles) for turning in tight spaces like parking lots and off-road trails.

Figure 3B:
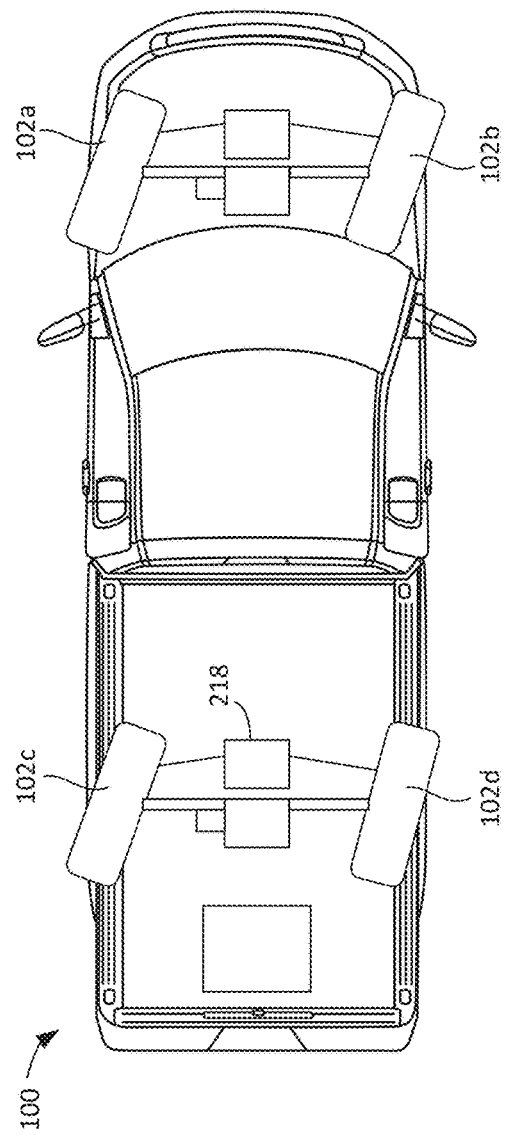
FIG. 3B shows an example orientation of the wheels of the example vehicle of FIGS. 1 and 2 at higher speeds in the four-wheel steering mode.

FIG. 3B shows an example in which the rear steering actuator controller 228 (FIG. 2) activates the rear steering controller 218 to turn the rear wheels 102c, 102d in the same direction as the front wheels 102a, 102b. For example, if the driver turns the steering wheel 231 (FIG. 2) to the right, the front wheels 102a, 102b are turned to the right and the rear wheels 102c, 102d are turned to the right, which is shown in FIG. 3B. Conversely, if the driver turns the steering wheel 231 (FIG. 2) to the left, the front wheels 102a, 102b are turned to the left and the rear wheels 102c, 102d are turned to the left. The degree of turning is based on the degree of rotation of the steering wheel 231.

In some examples, the rear steering actuator controller 228 (FIG. 2) activates the rear steering actuator 218 to turn the rear wheels 102c, 102d in the opposite direction as the front wheels 102a, 102b when the vehicle 100 is traveling at a speed that is below a threshold speed (e.g., 25 miles-per-hour (mph)) and in the same direction when the vehicle 100 is traveling at a speed above the threshold speed. For example, the rear steering control actuator 228 can compare the speed (as determined by the speed determiner 234 (FIG. 2)) to the threshold speed and, based on whether the speed is above or below the threshold speed, operate to turn the rear wheels 102c, 102d in the same direction or opposite direction as the front wheels 102a, 102b.

As disclosed above, in some instances, the vehicle 100 may lose traction with the ground, such as when driving through mud, snow, ice, sand, ruts in the dirt, etc. In such an instance, the vehicle 100 may become stuck and unable to drive out of its current location. Referring back to FIG. 2, the ECU 200 includes a crawl mode controller 242. The crawl mode controller 242 can execute a set (e.g., a sequence or series) of operations to navigate the vehicle 100 out of a stuck situation, as disclosed in further detail herein. In some examples, the crawl mode controller 242 can initiate a certain operation depending on the desired direction of travel. For example, the crawl mode controller 242 can initiate a left crawl operation to move the vehicle 100 laterally to the left, a right crawl operation to move the vehicle 100 laterally to the right, a forward crawl operation to move the vehicle 100 forward, or a reverse crawl operation to move the vehicle 100 backward or in the reverse direction. Examples of these operations are shown in FIGS. 4A, 4B, 5A, and 5B. In some examples, an operation is initiated in response to a request by the driver (or another person) via the user input device 240. For example, the driver may request a left crawl operation, a right crawl operation, a forward crawl operation, or a reverse crawl operation via the user input device 240. When such a request is received, the ECU 200 executes a set of instructions or operations that controls the various components of the vehicle 100 and causes the vehicle 100 to move in the corresponding direction, as disclosed in further detail herein.

Figure 4A:
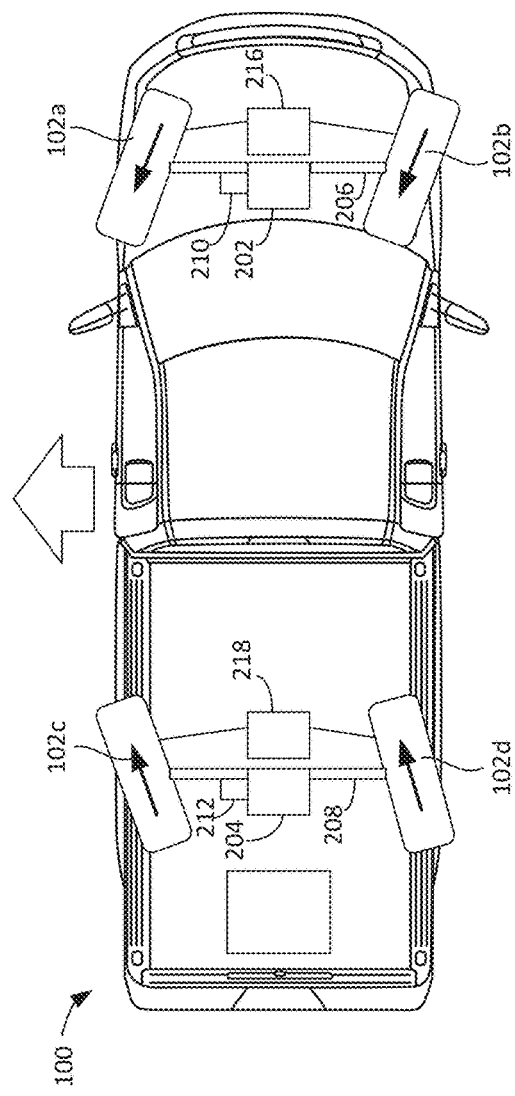
FIG. 4A shows an example orientation and driving direction of the wheels of the example vehicle of FIGS. 1 and 2 during an example left crawl operation disclosed herein.

FIG. 4A shows an example in which the crawl mode controller 242 (FIG. 2) implements the left crawl operation to move the vehicle 100 laterally to the left. When the left crawl operation is initiated, the crawl mode controller 242 instructs the front steering actuator controller 226 (FIG. 2) to activate the front steering actuator 216 to turn the front wheels 102a, 102b to the right (e.g., to the maximum or limit angle to the right). The crawl mode controller 242 also instructs the rear steering actuator controller 228 (FIG. 2) to activate the rear steering actuator 218 to the turn the rear wheels 102c, 102d to the left (e.g., to the maximum or limit angle to the left) such that the front wheels 102a, 102b and the rear wheels 102c, 102d are turned in opposite directions, as shown in FIG. 4A. In some examples, the front wheels 102a, 102b and the rear wheels 102c, 102d are turned the same degree or angle but in opposite directions. For example, the front wheel 102a, 102b may be turned to an angle of 30° to the right, and the rear wheels 102c, 102d may be turned to an angel of 30° to the left. The front and rear wheels 102a-102d may be turned to their positions simultaneously or at different times (e.g., the front wheels 102a, 102b are turned first, and then the rear wheels 102c, 102d are turned). In some examples, during the left crawl operation, the wheels 102a-102d are turned to their maximum or limit steering angles. In other examples, the wheels 102a-102d may be turned to an angle that is less than their maximum steering angles.

After the wheels 102a-102d are turned to their positions shown in FIG. 4A, the crawl mode controller 242 (FIG. 2) instructs the front drive motor controller 220 (FIG. 2) to activate the front drive motor 202 to drive the front wheels 102a, 102b in the reverse direction (as shown by the arrows on the front wheels 102a, 102b), and instructs the rear drive motor controller 222 (FIG. 2) to activate the rear drive motor 204 to drive the rear wheels 102c, 102d in the forward direction (as shown by the arrows on the rear wheels 102c, 102d) while the front wheels 102a, 102b are being driven in the reverse direction. As such, all of the wheels 102a-102d are being driven at the same time. In some examples, the wheels 102a-102d are driven at the same rotational speed, which may be a relatively low speed, such as 5 mph. The front wheels 102a, 102b produce a driving force in the rearward and left direction, while the rear wheels 102c, 102d produce a driving force in the forward and left direction. The rearward and forward forces cancel out or counter each other, but the leftward forces result in a net positive driving force in the left direction, as shown by the arrow in FIG. 4A. This resultant force drives or moves the vehicle 100 sideways, in the left direction, without moving the vehicle 100 forward or backward. Further, if the wheels 102a-102d are in ruts, for example, turning the wheels 102a-102d as shown in FIG. 4A helps the wheels 102a-102d gain more traction along the walls of the ruts and moves dirt or mud from the walls into the ruts for more traction. As a result, the vehicle 100 moves laterally to the left and out of the rut or obstruction.

In some examples, the wheels 102a-102d are turned to their corresponding positions shown in FIG. 4A first and then the wheels 102a-102d are driven forward or reverse. In other examples, the wheels 102a-102d may be driven before or at the same time the wheels 102a-102d are turned to their corresponding positions shown in FIG. 4A.

In some examples, prior to activating the front and rear drive motors 202, 204 and driving the wheels 102a-102d, the differential lock controller 232 (FIG. 2) activates the front and rear differential locks 210, 212 to lock the front and rear differentials 206, 208, respectively. This ensures all of the wheels 102a-102d are driving at the same rotational speed. Otherwise, if one of the wheels slips, all of the power may be transferred to the other wheel and creates an uneven balance of force.

In some examples, while the wheels 102a-102d are driving, the crawl mode controller 242 (FIG. 2) monitors the orientation and movement of the vehicle 100. For example, the vehicle 100 includes a yaw sensor 244 (FIG. 2). The yaw sensor 244 measures the rotation of the vehicle 100 about a vertical or Z axis extending through the vehicle 100. The ECU 200 (FIG. 2) can modulate power to the front and/or rear drive motors 202, 204 based on measurements from the yaw sensor 244 to limit (e.g., reduce or prevent) rotation of vehicle 100. In particular, if the crawl mode controller 242 determines the vehicle 100 is starting to spin or rotate, the front and/or rear drive motor controllers 220, 222 modulate (e.g., increase or decrease) power applied to the front and/or rear drive motors 202, 204, respectively, to change the speed of the front wheels 102, 102b and/or the rear wheels 102c, 102d, respectively. This reduces or prevents the vehicle 100 from rotating and ensures the movement of the vehicle 100 is mainly in the left direction. Additionally or alternatively, the front and/or rear steering actuator controllers 216, 218 (FIG. 2) can change (e.g., increase or decrease) the angle of the front wheels 102a, 102b and/or the rear wheels 102c, 102d, respectively, to help keep the vehicle 100 from rotating.

In some examples, the crawl mode controller 242 continues to drive the wheels 102a-102d until the driver (or another person) cancels the left crawl operation. For example, when the driver determines the vehicle 100 has moved a sufficient amount to the left where the vehicle 100 has more traction (e.g., on flat ground outside of the rut), the driver can cancel or deactivate the left crawl operation via the user input device 240. Additionally or alternatively, the crawl mode controller 242 may continue to drive the wheels 102a-102d until the crawl mode controller 242 determines the vehicle 100 has reached a location with sufficient traction. For example, the crawl mode controller 242 can receive input from one or more of the sensors 236, which may include torque sensors associated with one or more of the wheels 102a-102d. If traction improves, the torque sensors measure an increase of torque at the wheels 102-102d. The crawl mode controller 242 detects this increase in torque and deactivates or cancels the operation. As another example, the crawl mode controller 242 can determine the total distance the vehicle 100 has moved (e.g., based on measurements from the sensor(s) 238) and deactivate the operation after the vehicle 100 has moved a sufficient amount (e.g., 5 feet). In other examples, other sensors and/or types of inputs can be used to determine when the vehicle 100 has reached a location with sufficient traction.

Once the operation is deactivated, the crawl mode controller 242 (FIG. 2) instructs the front and rear drive motor controllers 220, 222 (FIG. 2) to stop driving the wheels 102a-102d, instructs the front and rear steering actuator controllers 216, 218 (FIG. 2) to turn the wheels 102a-102d back to their middle or neutral position (or other position corresponding to the current angle of the steering wheel 231 (FIG. 2)), and instructs the differential lock controller 232 (FIG. 2) to unlock the front and rear differentials 206, 208. The vehicle 100 can then be operated in a normal driving mode.

Figure 4B:
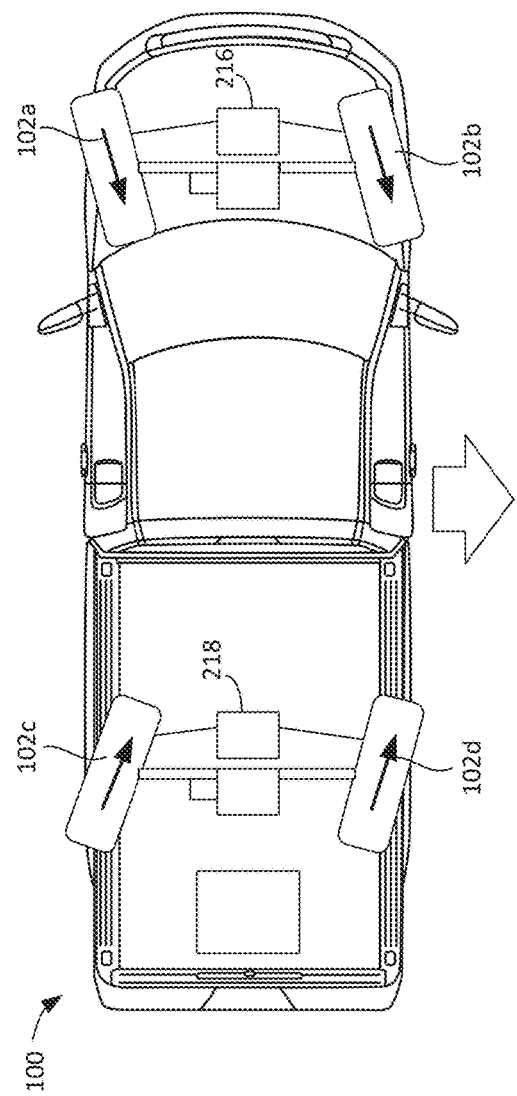
FIG. 4B shows an example orientation and driving direction of the wheels of the example vehicle of FIGS. 1 and 2 during an example right crawl operation disclosed herein.

FIG. 4B shows an example in which the crawl mode controller 242 (FIG. 2) implements the right crawl operation to move the vehicle 100 laterally to the right. The right crawl operation is substantially the same as the left crawl operation disclosed above but the wheels 102a-102d are turned in the opposite direction. In particular, during the right crawl operation, the crawl mode controller 242 instructs the front steering actuator controller 226 (FIG. 2) to activate the front steering actuator 216 to turn the front wheels 102a, 102b to the left (e.g., to the maximum or limit angle to the right), and instructs the rear steering actuator controller 228 (FIG. 2) to activate the rear steering actuator 218 to the turn the rear wheels 102c, 102d to the right (e.g., to the maximum or limit angle to the right). The rest of the operation occurs in substantially the same manner as the left crawl operation disclosed above and is not repeated herein to avoid redundancy. In this operation, the resultant force generated by the wheels 102a-102d is to the right (as shown by the arrow in FIG. 4B), which drives or moves the vehicle 100 laterally to the right without moving the vehicle 100 forward or backward.

While in the examples disclosed in connection with FIGS. 4A and 4B the crawl mode controller 242 (FIG. 2) automatically performs all of the operations to move the vehicle 100 sideways (in the left or right direction), in other examples, one or more of the operations may be manually controlled by the driver. For example, the crawl mode controller 242 may instruct the front and rear steering actuator controllers 226, 228 to turn the wheels 102a-102d based on the angle of the steering wheel 231. As such, the driver can turn the steering wheel 231 to cause the wheels 102a-102d to turn back-and-forth. This enables the driver to manually control and modulate the angle of the wheels 102a-102d. In the left or right crawl operations, the rear steering actuator controller 228 (FIG. 2) is instructed to steer the rear wheels 102c, 102d in the opposite direction as the front wheels 102a, 102b. Additionally or alternatively, the crawl mode controller 242 can instruct the front and rear drive motor controllers 220, 222 (FIG. 2) to drive the wheels 102a-102d based on input from the accelerator pedal 225. As such, the driver can control the speed of the wheels 102a-102d. In the left or right crawl operations, the front wheels 102a, 102b are driven in the reverse direction while the rear wheels 102c, 102d are driven in the forward direction. Therefore, the driver can manually control the angle of the wheels 102a-102d and/or the speed of the wheels 102a-102d to help move the vehicle 100 out of the stuck condition.

As disclosed above, the crawl mode controller 242 (FIG. 2) can also perform a forward crawl operation or a reverse crawl operation. FIG. 5A shows an example in which the crawl mode controller 242 implements the forward crawl operation, which moves the vehicle 100 in the forward direction. In this example, the vehicle 100 has four-wheel independent steering. In particular, the vehicle 100 has a left front steering actuator 500 for independently steering the left front wheel 102a and a right front steering actuator 502 for independently steering the right front wheel 102b. The left and right front steering actuators 500, 502 are controlled by the front steering actuator controller 226 (FIG. 2) (or may be controlled by separate controllers). Similarly, the vehicle 100 has a left rear steering actuator 504 for independently steering the left rear wheel 102c and a right rear steering actuator 506 for independently steering the right rear wheel 102d. The left and right rear steering actuators 504, 506 are controlled by the rear steering actuator controller 228 (FIG. 2) (or may be controlled by separate controllers). The left and right crawl operations disclosed above can be similarly implemented in connection with the four-wheel independent steering arrangement shown in FIG. 5A.

When the forward crawl operation is initiated, the crawl mode controller 242 (FIG. 2) instructs the front steering actuator controller 226 (FIG. 2) to activate the left front steering actuator 500 to turn the left front wheel 102a to the right and instructs the front steering actuator controller 226 to activate the right front steering actuator 502 to turn the right front wheel 102b to the left, as shown in FIG. 5A. Further, the crawl mode controller 242 instructs the rear steering actuator controller 228 (FIG. 2) to activate the left rear steering actuator 504 to the turn the left rear wheel 102c to the right and instructs the rear steering actuator controller 228 to activate the right rear steering actuator 506 to turn the right rear wheel 102*d* to the left, as shown in FIG. 5A. As a result, the left front and rear wheels 102*a*, 102*c* and the right front and rear wheels 102*b*, 102*d* are turned in opposite directions. In some examples, the left front and rear wheels 102*a*, 102*c* and the right front and rear wheels 102*b*, 102*d* are turned the same degree or angle but in opposite directions. For example, the left front and rear wheels 102*a*, 102*c* may be turned to an angle of 30° to the right, and the right front and rear wheels 102*b*, 102*d* may be turned to an angel of 30° to the left. The front and rear wheels 102*a*-102*d* may be turned to their positions simultaneously or at different times (e.g., the left front and rear wheels 102*a*, 102*c* are turned first, and then the right front and rear wheels 102*b*, 102*d* are turned). Then, the crawl mode controller 242 instructs the front and rear drive motor controllers 220, 222 (FIG. 2) to activate the front and rear drive motors 202, 204, respectively, to drive the front wheels 102*a*, 102*b* and the rear wheels 102*c*, 102*d*, respectively, in the forward direction (as shown by the arrows on the wheels 102*a*-102*d* in FIG. 5A). The left wheels 102*a*, 102*c* produce a driving force in the forward and right direction and the right wheels 102*b*, 102*d* produce a driving force in the forward and left direction. The left and right forces cancel out or counter each other, but the forward forces result in a net positive driving force in the forward direction, as shown by the arrow in FIG. 5A. This resultant force drives or moves the vehicle 100 forward without moving the vehicle 100 left or right. If the wheels 102*a*-102*d* are in ruts, for example, turning the wheels 102*a*-102*d* as shown in FIG. 5A helps the wheels 102*a*-102*d* gain more traction along the walls of the ruts and moves dirt or mud from the walls into the ruts for more traction. As a result, the vehicle 100 moves forward and out of the rut or obstruction.

In some examples, during the forward crawl operation, the wheels 102*a*-102*d* are turned to their maximum or limit steering angles. In other examples, the wheels 102*a*-102*d* may be turned to an angle that is less than their maximum steering angles.

Similar to the left and right crawl operations disclosed above, prior to driving the wheels 102*a*-102*d*, the differential lock controller 232 (FIG. 2) can activate the front and rear differential locks 210, 212 to lock the front and rear differentials 206, 208, respectively. Further, similar to the left and right crawl operations disclosed above, the crawl mode controller 242 (FIG. 2) monitors the orientation and movement of the vehicle 100 (e.g., based on measurements from the yaw sensor 244) and can modulate (e.g., increase or decrease) the power to the wheels 102*a*-102*d* to limit (e.g., reduce or prevent) rotation of the vehicle 100. The crawl mode controller 242 can continue to drive the wheels 102*a*-102*d* until the driver (or another person) cancels the operation or the crawl mode controller 242 determines the vehicle 100 has gained traction or moved to a location with better traction. Once the operation is deactivated, the crawl mode controller 242 instructs the front and rear drive motor controllers 220, 222 (FIG. 2) to stop driving the wheels 102*a*-102*d*, instructs the front and rear steering actuator controllers 226, 228 (FIG. 2) to turn the wheels 102*a*-102*d* back to the middle or neutral position (or other position corresponding to the current angle of the steering wheel 231), and instructs the differential lock controller 232 to unlock the front and rear differentials 206, 208.

FIG. 5B shows an example in which the crawl mode controller 242 (FIG. 2) implements the reverse crawl operation to move the vehicle 100 backward or in the reverse direction. The reverse crawl operation is substantially the same as the forward crawl operation but the wheels 102*a*-102*d* are turned in the opposite direction and the wheels 102*a*-102*d* are driven in the reverse direction. In particular, during the reverse crawl operation, the crawl mode controller 242 instructs the front and rear steering actuator controller 226, 228 (FIG. 2) to activate the left front steering actuator 500 and the left rear steering actuator 504, respectively, to turn the left front and rear wheels 102*a*, 102*c*, respectively to the left. Further, the crawl mode controller 242 instructs the front and rear steering actuator controllers 226, 228 to activate the right front steering actuator 502 and the right rear steering actuator 506, respectively, to turn the right front and rear wheels 102*b*, 102*d* to the right. Then, the crawl mode controller 242 instructs the front and rear drive motor controllers 220, 222 (FIG. 2) to activate the front and rear drive motors 202, 204, respectively, to drive the front wheels 102*a*, 102*b* and the rear wheels 102*c*, 102*d*, respectively in the reverse direction (as shown by the arrows on the wheels 102*a*-102*d* in FIG. 5B). The rest of the operation occurs in substantially the same manner as the forward crawl operation disclosed above and is not repeated here to avoid redundancy. In this operation, the resultant force is the rearward direction (as shown by the arrow in FIG. 5B), which drives or moves the vehicle 100 rearward without moving the vehicle 100 to the left or right.

In some examples, one or more operations of the forward crawl operation or the reverse crawl operation may be controlled by the driver. For example, the crawl mode controller 242 (FIG. 2) can instruct the front and rear drive motor controllers 220, 222 (FIG. 2) to drive the wheels 102*a*-102*d* based on input from the accelerator pedal 225. As such, the driver can control the speed of the wheels 102*a*-102*d*. In the forward or reverse crawl operations, the front wheels 102*a*, 102*b* and the rear wheels 102*c*, 102*d* are driven in the same direction.

While in the examples disclosed above the drive motors 202, 204 are described as being electric motors, in other examples, the drive motors 202, 204 can be gas powered engines. In such an example, the front and rear drive motor controllers 220, 222 can control the direction of the driving power via one or more transmissions and/or clutches. In some examples, only one motor may be implemented. In such an example, a system of transmissions and/or clutches can be used to provide driving power independently to the front wheels 102*a*, 102*b* and the rear wheels 102*c*, 102*d*. In some examples, the steering actuators 216, 218, 500, 502, 504, 506 are electric actuators. In other examples, the steering actuators 216, 218, 500, 502, 504, 506 may be mechanically and/or hydraulically actuated. Any of the steering actuators 216, 218, 500, 502, 504, 506 can be coupled via one or more systems to the steering wheel 231.

While an example manner of implementing the ECU 200 is illustrated in FIG. 2, one or more of the elements, processes and/or devices illustrated in FIG. 2 may be combined, divided, re-arranged, omitted, eliminated and/or implemented in any other way. Further, the example front drive motor controller 220, the example rear drive motor controller 222, the example front steering actuator controller 226, the example rear steering actuator controller 228, the example differential lock controller 232, the example speed determiner 234, the example four-wheel steering controller 238, the example crawl mode controller 242 and/or, more generally, the example ECU 200 of FIG. 2 may be implemented by hardware, software, firmware and/or any combination of hardware, software and/or firmware. Thus, for example, any of the example front drive motor controller 220, the example rear drive motor controller 222, the example front steering actuator controller 226, the example rear steering actuator controller 228, the example differential lock controller 232, the example speed determiner 234, the example four-wheel steering controller 238, the example crawl mode controller 242 and/or, more generally, the example ECU 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example front drive motor controller 220, the example rear drive motor controller 222, the example front steering actuator controller 226, the example rear steering actuator controller 228, the example differential lock controller 232, the example speed determiner 234, the example four-wheel steering controller 238, and/or the example crawl mode controller 242 is/are hereby expressly defined to include a non-transitory computer readable storage device or storage disk such as a memory, a digital versatile disk (DVD), a compact disk (CD), a Blu-ray disk, etc. including the software and/or firmware. Further still, the example ECU 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
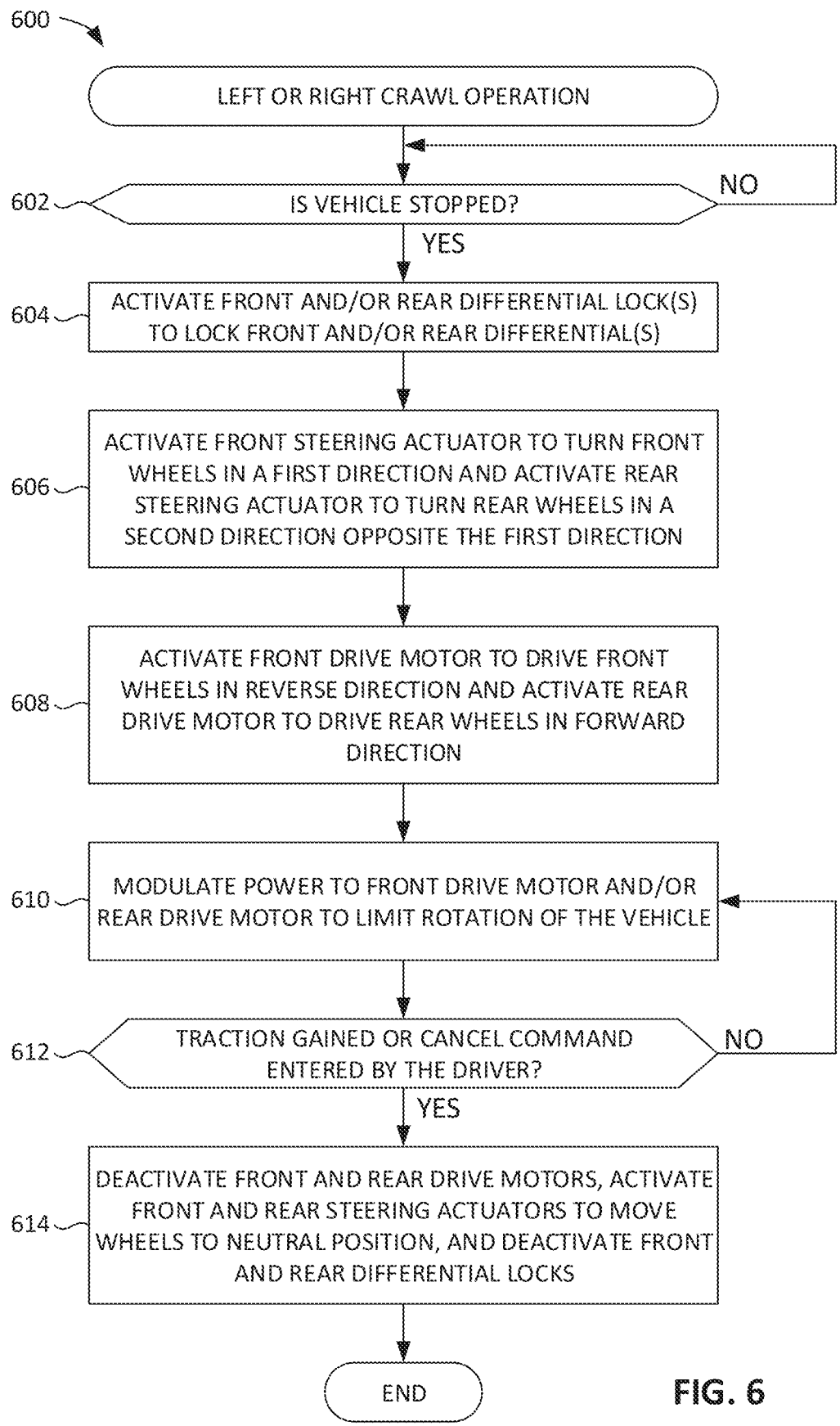
FIG. 6 is a flowchart representative of machine readable instructions that may be executed to implement the example ECU of FIG. 2 to implement an example left crawl operation or an example right crawl operation.
Figure 7:
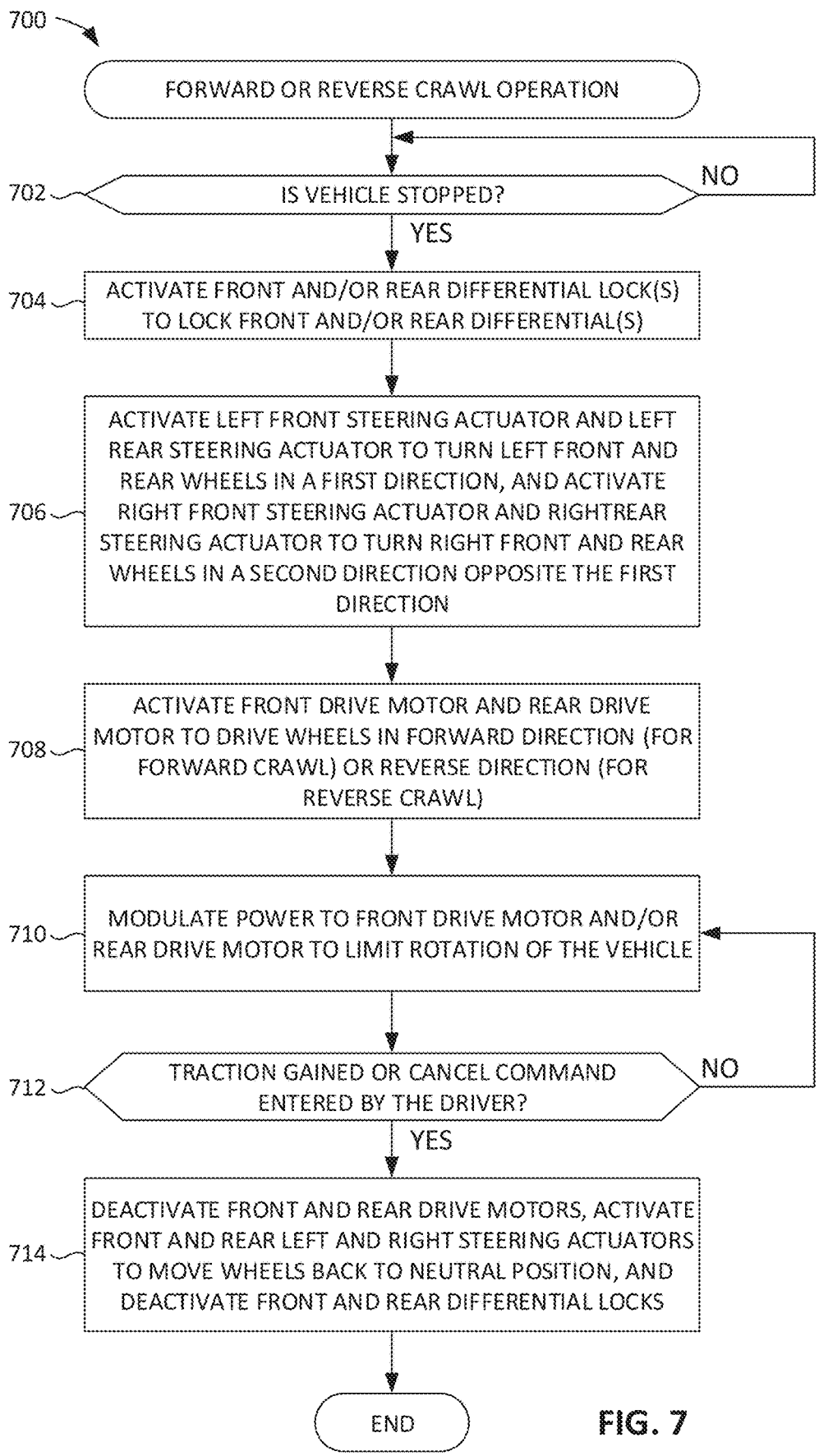
FIG. 7 is a flowchart representative of machine readable instructions that may be executed to implement the example ECU of FIG. 2 to implement an example forward crawl operation or an example reverse crawl operation.

Flowcharts representative of example hardware logic, machine readable instructions, hardware implemented state machines, and/or any combination thereof for implementing the ECU 200 of FIG. 2 are shown in FIGS. 6 and 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example ECU 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart of an example process 600 representative of machine readable instructions that may be executed by the ECU 200 to implement a left crawl operation or a right crawl operation, such as the left and right crawl operations shown in FIGS. 4A and 4B, respectively. The instructions to implement the operation may be initiated by the crawl mode controller 242 in response to a request for a left crawl operation or a right crawl operation from the driver (or another person). The driver may enter the request via the user input device 240, for example.

In some examples, at block 602, the crawl mode controller 242 checks whether the vehicle 100 is stopped. This confirms it is safe to initiate the left or right crawl operation. The crawl mode controller 242 can check the speed of the vehicle 100 as determined by the speed determiner 234. If the speed is positive or negative (indicating the vehicle 100 is still moving), the crawl mode controller 242 waits and re-checks (e.g., every 2 seconds, every 5 seconds, etc.) whether the vehicle 100 has stopped moving. If the vehicle 100 is stopped, the differential lock controller 232, at block 604, activates the front and/or rear differential locks 210, 212 to lock the front and/or rear differentials 206, 208, respectively. In other examples, the vehicle 100 may have separate drive motors for each of the wheels 102a-102d. In such an example, the vehicle 100 may not have differential locks.

At block 606, the front steering actuator controller 226 activates the front steering actuator 216 to turn the left and right front wheels 102a, 102b in a first direction and the rear steering actuator controller 228 activates the rear steering actuator 218 to turn the left and right rear wheels 102c, 102d in a second direction opposite the first direction. If the vehicle includes four-wheel independent steering, such as shown in FIGS. 5A and 5B, then each of the wheels 102a-102d can be independently turned. As such, the front wheels 102a, 102b and the rear wheels 102c, 102d are turned in opposite directions. If the operation is a left crawl operation, the first direction is right and the second direction is left, as shown in FIG. 4A. If the operation is a right crawl operation, the first direction is left and the second direction is right, as shown in FIG. 4B.

At block 608, the front drive motor controller 220 activates the front drive motor 202 to drive the left and right front wheels 102a, 102b in the reverse direction and the rear drive motor controller 222 activates the rear drive motor 204 to drive the rear wheels 102c, 102d in the forward direction while the front wheels are being driven in the reverse direction. As disclosed above, this results in a net positive force in the left or right direction. This net positive force moves the vehicle 100 to the left or right and away from the current location where there is less traction. In some examples, the front and rear drive motors 202, 204 drive the wheels 102a-102d at the same speed (e.g., 5 mph).

At block 610, the front and/or rear drive motor controllers 220, 222 modulate (e.g., increase or decrease) the power to the front and/or rear drive motors 202, 204, respectively, to limit (e.g., reduce or prevent) rotation the vehicle 100. This ensures the vehicle 100 generally moves only in the left or right direction. In some examples, the front and/or rear drive motor controllers 220, 222 modulate the power to the front and/or rear drive motors 202, 204, respectively, based on measurements from one or more sensors, such as the yaw sensor 244. For example, if the yaw sensor 244 detects the vehicle 100 starts to spin or rotate, the front and/or rear drive motor controllers 220, 222 can increase or decrease the power to the front wheels 102a, 102b and/or the rear wheels 102c, 102d to counter the spinning motion and keep the vehicle 100 moving generally sideways. Additionally or alternatively, the front and/or rear steering actuator controllers 226, 228 can change (e.g., increase or decrease) the steering angle of the front wheels 102a, 102b and/or the rear wheels 102c, 102d, respectively, to help limit the vehicle 100 from rotating.

At block 612, the crawl mode controller 242 determines whether the vehicle 100 has gained traction and/or a cancel command has been entered by the driver (or another person) to cancel the operation. If the vehicle 100 has gained traction and/or a cancel command has been received from the driver, control proceeds to block 614 and the ECU 200 deactivates the operation, as disclosed in further detail below. If not, control proceeds back to block 610 and the front and/or rear drive motor controllers 220, 222 continue to modulate power to the front and/or rear drive motors 202, 204, respectively, to keep the vehicle 100 moving laterally sideways. The crawl mode controller 242 continues to check (e.g., every 2 seconds, every 5 seconds, etc.) whether the vehicle 100 has gained traction and/or the driver has cancelled the operation. In some examples, the crawl mode controller 242 determines whether the vehicle 100 has gained traction based on measurements from one or more of the sensors 236, which can include one or more torque sensors associated with one or more of the wheels 102a-102d. Additionally or alternatively, the crawl mode controller 242 may deactivate the operation once the vehicle 100 has travelled a certain distance (e.g., 5 feet to the left or right). Further, the driver can enter a cancel command into the user input device 240 at any time to deactivate the operation.

At block 614, the crawl mode controller 242 deactivates the left or right crawl operation. In particular, the front and rear drive motor controllers 220, 222 deactivate the front and rear drive motors 202, 204, respectively, the front and rear steering actuator controllers 226, 228 activate the front and rear steering actuators 216, 218, respectively, to move the wheels 102a-102d back to their neutral position (or position corresponding to the current steering wheel angle), and the differential lock controller 232 deactivates (e.g., unlocks) the front and rear differentials locks 210, 212 to unlock the front and rear differentials 206, 208, respectively.

FIG. 7 is a flowchart of an example process 700 representative of machine readable instructions that may be executed by the ECU 200 to implement a forward crawl operation or a reverse crawl operation, such as the forward and reverse crawl operations shown in FIGS. 5A and 5B, respectively. The instructions to implement the operation may be initiated by the crawl mode controller 242 in response to a request for a forward crawl operation or a reverse crawl operation from the driver (or another person). The driver may enter the request via the user input device 240, for example.

In some examples, at block 702, the crawl mode controller 242 checks whether the vehicle 100 is stopped. If the vehicle 100 is not stopped, the crawl mode controller 242 waits and re-checks (e.g., every 2 seconds, every 5 seconds, etc.) whether the vehicle 100 has stopped moving. If the vehicle 100 is stopped, the differential lock controller 232, at block 704, activates the front and/or rear differential locks 210, 212 to lock the front and/or rear differentials 206, 208, respectively. In other examples, such as if the vehicle 100 has independent driving motors for the wheels 102a-102d, no differential locks may be used.

At block 706, the front and rear steering actuator controllers 226, 228 activate the left front and rear steering actuators 500, 504, respectively, to turn the left front and rear wheels 102a, 102c, respectively in a first direction. Additionally, the front and rear steering actuator controllers 226, 228 activate the right front and rear steering actuators 502, 506, respectively, to turn the right front and rear wheels 102b, 102d, respectively in a second direction opposite the first direction. If the operation is a forward crawl operation, the first direction is right and the second direction is left, as shown in FIG. 5A. If the operation is a reverse crawl operation, the first direction is left and the second direction is right, as shown in FIG. 5B.

At block 708, the front and rear drive motor controllers 220, 222 activate the front and rear drive motors 202, 204, respectively, to drive the wheels 102a-102d in a same direction. If the operation is the forward crawl operation, the wheels 102a-102d are driven in the forward direction, as shown in FIG. 5A. If the operation is the reverse crawl operation, the wheels 102a-102d are driven in the reverse direction, as shown in FIG. 5B. As disclosed above, this results in a net positive force in the forward or rearward direction. This net positive force moves the vehicle 100 forward or rearward and, thus, out of the current location where there is less traction.

At block 710, the front and/or rear drive motor controllers 220, 222 modulate (e.g., increase or decrease) the power to the front and/or rear drive motors 202, 204, respectively, to limit (e.g., reduce or prevent) rotation of the vehicle 100. This ensures the vehicle 100 generally moves only in the forward or reverse direction. In some examples, the front and/or rear drive motor controllers 220, 222 modulate the power to the front and/or rear drive motors 202, 204, respectively, based on measurements from one or more sensors, such as the yaw sensor 244. Additionally or alternatively, the front and/or rear steering actuator controllers 226, 228 can change (e.g., increase or decrease) the steering angle of the front wheels 102a, 102b and/or the rear wheels 102c, 102d, respectively, to help keep the vehicle 100 from rotating.

At block 712, the crawl mode controller 242 determines whether the vehicle 100 has gained traction and/or a cancel command has been entered by the driver (or another person) to cancel the operation. This block is substantially the same as block 612 of FIG. 6 and is not repeated herein to avoid redundancy. At block 714, the crawl mode controller 242 deactivates the forward or reverse crawl operation. This block is substantially the same as block 614 of FIG. 6 and is not repeated herein to avoid redundancy.

Figure 8:
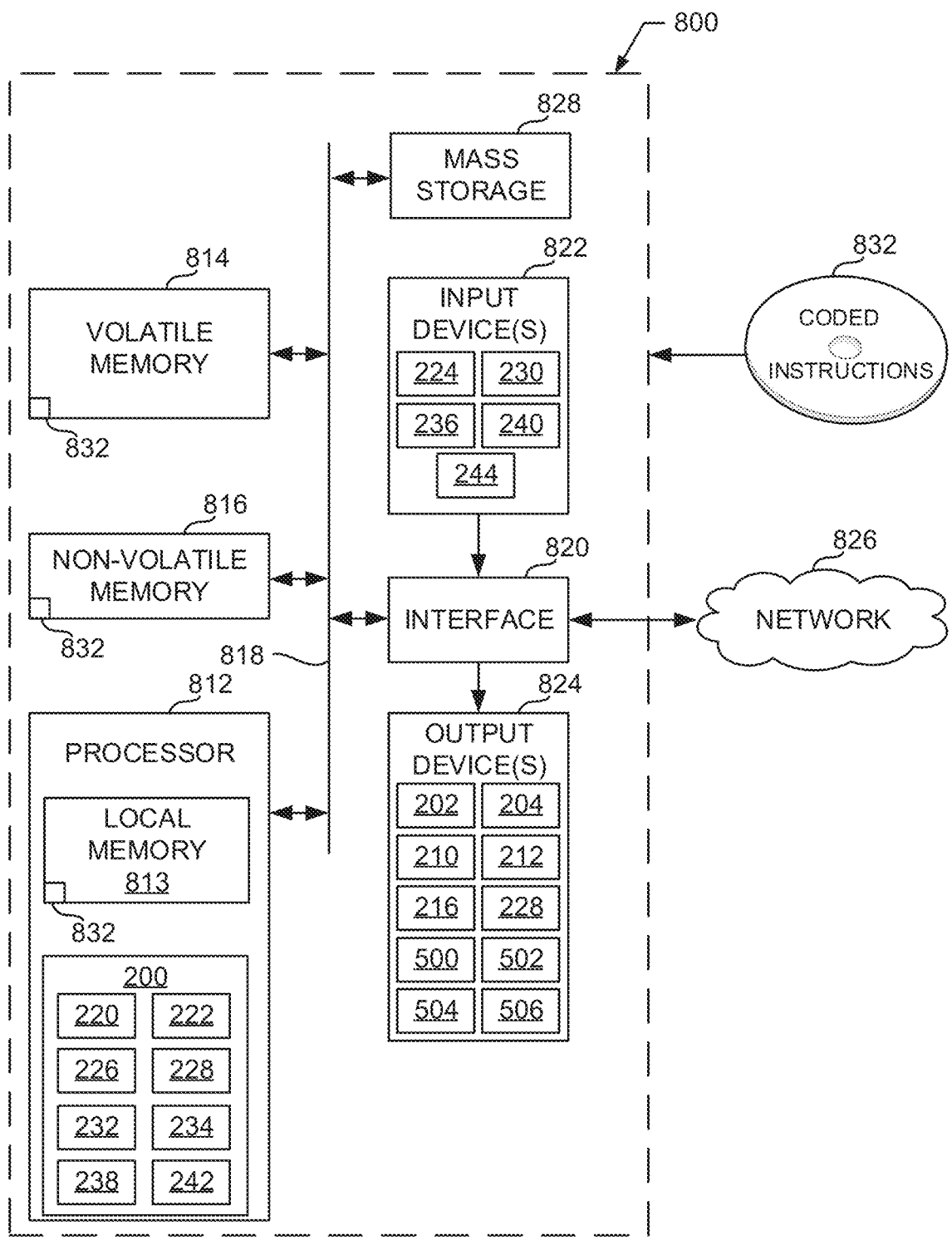
FIG. 8 is a block diagram of an example processing platform structured to execute the instructions of FIGS. 6 and 7 to implement the example ECU of FIG. 2.

FIG. 8 is a block diagram of an example processor platform 800 structured to execute the instructions of FIGS. 6 and 7 to implement the ECU 200 of FIG. 2. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements example front drive motor controller 220, the example rear drive motor controller 222, the example front steering actuator controller 226, the example rear steering actuator controller 228, the example differential lock controller 232, the example speed determiner 234, the example four-wheel steering controller 238, the example crawl mode controller 242 and/or, more generally, the example ECU 200.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 1012. In this example, the input device(s) include the example pedal sensor 224, the example steering wheel sensor 230, the example sensor(s) 236, the example user input device 240, and the example yaw sensor 244. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. In this example, the output device(s) 824 include the front drive motor 202, the rear drive motor 204, the front differential lock 210, the rear differential lock 212, the front steering actuator 216, the rear steering actuator 218, the left front steering actuator 500, the right front steering actuator 502, the left rear steering actuator 504, and the right rear steering actuator 506. The output device(s) 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 6 and 7 may be stored in the mass storage device 828, in the volatile memory 814, in the non-volatile memory 816, and/or on a removable non-transitory computer readable storage medium such as a CD or DVD.

From the foregoing, it will be appreciated that example methods, systems, apparatus, and articles of manufacture have been disclosed that help move a four-wheel steering vehicle out of a stuck condition. The examples disclosed herein leverage the four-wheel steering capability to generate a net positive driving force in a particular direction to move the vehicle toward an area with more traction. The examples disclosed herein improve maneuverability of vehicles, especially larger vehicles like pick-up trucks.

The following paragraphs provide various examples and combinations of the example disclosed herein:

Example 1 is a vehicle including a left front wheel, a right front wheel, a left rear wheel, and a right rear wheel. The vehicle also includes a front steering actuator to turn the left and right front wheels, a rear steering actuator to turn the left and right rear wheels, a front drive motor to drive the left and right front wheels, and a rear drive motor to drive the left and right rear wheels. The vehicle further includes an electronic control unit (ECU) to: activate the front steering actuator to turn the left and right front wheels in a first direction, activate the rear steering actuator to turn the left and right rear wheels in a second direction opposite the first direction such that the left and right front wheels and the left and right rear wheels are turned in opposite directions, activate the front drive motor to drive the left and right front wheels in a reverse direction, and activate the rear drive motor to drive the left and right rear wheels in a forward direction while the left and right front wheels are driven in the reverse direction.

Example 2 includes the vehicle of Example 1, further including a yaw sensor. The ECU is to modulate power to the front and rear drive motors based on measurements from the yaw sensor to limit rotation of the vehicle.

Example 3 includes the vehicle of Examples 1 or 2, further including a rear differential lock and a front differential lock. The ECU is to activate the front and rear differential locks prior to activating the front and rear drive motors.

Example 4 includes the vehicle of any of Examples 1-3, wherein the ECU is to activate the front and rear steering actuators and activate the front and rear drive motors in response to a request for a left crawl operation or right crawl operation from a driver.

Example 5 includes the vehicle of Example 4, wherein: when the request is for the left crawl operation, the ECU is to activate the front steering actuator to turn the left and right front wheels to the right and activate the rear steering actuator to turn the left and right rear wheels to the left, and when the request is for the right crawl operation, the ECU is to activate the front steering actuator to turn the left and right front wheels to the left and activate the rear steering actuator to turn the left and right rear wheels to the right.

Example 6 includes the vehicle of Examples 4 or 5, wherein the ECU is to deactivate the left crawl operation or the right crawl operation in response to a cancel command from the driver.

Example 7 includes the vehicle of any of Example 4-6, wherein the ECU is to deactivate the left crawl operation or the right crawl operation in response to determining the vehicle has gained traction.

Example 8 includes the vehicle of Example 7, further including one or more torque sensors associated with one or more of the wheels. The ECU to determine the vehicle has gained traction based on measurements from the one or more torque sensors.

Example 9 is a non-transitory machine readable medium including instructions that, when executed, cause an electronic control unit (ECU) of a vehicle to: activate a front steering actuator of the vehicle to turn front wheels of the vehicle in a first direction, activate a rear steering actuator of the vehicle to turn rear wheels of the vehicle a second direction opposite the first direction such that the front wheels and the rear wheels are turned in opposite directions, activate a front drive motor to drive the front wheels in a reverse direction, and activate a rear drive motor to drive the rear wheels in a forward direction while the front wheels are driven in the reverse direction.

Example 10 includes the non-transitory machine readable medium of Example 9, wherein the instructions, when executed, cause the ECU to modulate power to the front and rear drive motors based on measurements from a yaw sensor to limit rotation of the vehicle.

Example 11 includes the non-transitory machine readable medium of Examples 9 or 10, wherein the instructions, when executed, cause the ECU to, prior to activating the front and rear drive motors, activate front and rear differential locks.

Example 12 includes the non-transitory machine readable medium of any of Examples 9-11, wherein the instructions, when executed, cause the ECU to, prior to activating the front and rear steering actuators and the front and rear drive motors, determine whether the vehicle is stopped.

Example 13 is a vehicle including a left front wheel, a right front wheel, a left rear wheel, and a right rear wheel. The vehicle also includes a left front steering actuator to turn the left front wheel, a right front steering actuator to turn the right front wheel, a left rear steering actuator to turn the left rear wheel, a right rear steering actuator to turn the right rear wheel, a front drive motor to drive the left and right front wheels, and a rear drive motor to drive the left and right rear wheels. The vehicle further includes an electronic control unit (ECU) to: activate the left front steering actuator and the left rear steering actuator to turn the left front wheel and the left rear wheel, respectively, in a first direction, activate the right front steering actuator and the right rear steering actuator to turn the right front wheel and the right rear wheel, respectively, in a second direction while the left front wheel and the left rear wheel are turned in the first direction, and activate the front drive motor and the rear drive motor to drive the left and right front wheels and the left and right rear wheels, respectively, in a same direction.

Example 14 includes the vehicle of Example 13, further including a yaw sensor. The ECU is to modulate power to the front and rear drive motors based on measurements from the yaw sensor to limit rotation of the vehicle.

Example 15 includes the vehicle of Examples 13 or 14, further including a rear differential lock and a front differential lock. The ECU is to activate the front and rear differential locks prior to activating the front and rear drive motors.

Example 16 includes the vehicle of any of Examples 13-15, wherein the ECU is to activate the left front steering actuator, the right front steering actuator, the left rear steering actuator, the right rear steering actuator, the front drive motor, and the rear drive motor in response to a request for a forward crawl operation or a reverse crawl operation from a driver.

Example 17 includes the vehicle of Example 16, wherein, when the request is for the forward crawl operation, the ECU is to: activate the left front steering actuator and the left rear steering actuator to turn the left front wheel and the left rear wheel, respectively, to the right, activate the right front steering actuator and the right rear steering actuator to turn the right front wheel and the right rear wheel, respectively, to the left, and activate the front and rear drive motors to drive the left and right front wheels and the left and right rear wheels, respectively, in a forward direction.

Example 18 includes the vehicle of Examples 16 or 17, wherein, when the request is for the reverse crawl operation, the ECU is to: activate the left front steering actuator and the left rear steering actuator to turn the left front wheel and the left rear wheel, respectively, to the left, activate the right front steering actuator and the right rear steering actuator to turn the right front wheel and the right rear wheel, respectively, to the right, and activate the front and rear drive motors to drive the left and right front wheels and the left and right rear wheels, respectively, in a reverse direction.

Example 19 includes the vehicle of any of Examples 16-18, wherein the ECU is to deactivate the forward crawl operation or the reverse crawl operation in response to a command from the driver.

Example 20 includes the vehicle of any of Examples 16-19, wherein the ECU is to deactivate the left crawl operation or the right crawl operation in response to determining the vehicle has gained traction.

Although certain example methods, systems, apparatus, and articles of manufacture have been disclosed herein, the scope of coverage of this patent is not limited thereto. On the contrary, this patent covers all methods, apparatus, systems, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle comprising:
    a left front wheel, a right front wheel, a left rear wheel, and a right rear wheel;
    a front steering actuator to turn the left and right front wheels;
    a rear steering actuator to turn the left and right rear wheels;
    a front drive motor to drive the left and right front wheels;
    a rear drive motor to drive the left and right rear wheels; and
    an electronic control unit (ECU) programmed to:
        activate the front steering actuator to turn the left and right front wheels in a first direction;
        activate the rear steering actuator to turn the left and right rear wheels in a second direction opposite the first direction such that the left and right front wheels and the left and right rear wheels are turned in opposite directions; and
        while the left and right front wheels are turned in the first direction and the left and right rear wheels are turned in the second direction, activate the front drive motor to drive the left and right front wheels in a reverse direction and activate the rear drive motor to drive the left and right rear wheels in a forward direction such that the left and right front wheels are driven in the reverse direction while the left and right rear wheels are driven in the forward direction.

2. The vehicle of claim 1, further including a yaw sensor, the ECU programmed to modulate power to the front and rear drive motors based on measurements from the yaw sensor to limit rotation of the vehicle.

3. The vehicle of claim 1, further including a rear differential lock and a front differential lock, the ECU programmed to activate the front and rear differential locks prior to activating the front and rear drive motors.

4. The vehicle of claim 1, wherein the ECU is programmed to activate the front and rear steering actuators and activate the front and rear drive motors in response to a request for a left crawl operation or right crawl operation from a driver.

5. The vehicle of claim 4, wherein:
    when the request is for the left crawl operation, the ECU is programmed to activate the front steering actuator to turn the left and right front wheels to the right and activate the rear steering actuator to turn the left and right rear wheels to the left; and
    when the request is for the right crawl operation, the ECU is programmed to activate the front steering actuator to turn the left and right front wheels to the left and activate the rear steering actuator to turn the left and right rear wheels to the right.

6. The vehicle of claim 4, wherein the ECU is programmed to deactivate the left crawl operation or the right crawl operation in response to a cancel command from the driver.

7. The vehicle of claim 4, wherein the ECU is programmed to deactivate the left crawl operation or the right crawl operation in response to determining the vehicle has gained traction.

8. The vehicle of claim 7, further including one or more torque sensors associated with one or more of the wheels, the ECU programmed to determine the vehicle has gained traction based on measurements from the one or more torque sensors.

9. A non-transitory machine readable medium comprising instructions that, when executed, cause an electronic control unit (ECU) of a vehicle to:
activate a front steering actuator of the vehicle to turn front wheels of the vehicle in a first direction;
activate a rear steering actuator of the vehicle to turn rear wheels of the vehicle in a second direction opposite the first direction such that the front wheels and the rear wheels are turned in opposite directions;
activate a front drive motor to drive the front wheels in a reverse direction; and
activate a rear drive motor to drive the rear wheels in a forward direction while the front drive motor is activated and driving the front wheels in the reverse direction and while the left and right front wheels are turned in the first direction and the left and right rear wheels are turned in the second direction.

10. The non-transitory machine readable medium of claim 9, wherein the instructions, when executed, cause the ECU to modulate power to the front and rear drive motors based on measurements from a yaw sensor to limit rotation of the vehicle.

11. The non-transitory machine readable medium of claim 9, wherein the instructions, when executed, cause the ECU to, prior to activating the front and rear drive motors, activate front and rear differential locks.

12. The non-transitory machine readable medium of claim 9, wherein the instructions, when executed, cause the ECU to, prior to activating the front and rear steering actuators and the front and rear drive motors, determine whether the vehicle is stopped.

13. A vehicle comprising:
a left front wheel, a right front wheel, a left rear wheel, and a right rear wheel;
a left front steering actuator to turn the left front wheel;
a right front steering actuator to turn the right front wheel;
a left rear steering actuator to turn the left rear wheel;
a right rear steering actuator to turn the right rear wheel;
a front drive motor to drive the left and right front wheels;
a rear drive motor to drive the left and right rear wheels; and
an electronic control unit (ECU) programmed to:
activate the left front steering actuator and the left rear steering actuator to turn the left front wheel and the left rear wheel, respectively, in a first direction;
activate the right front steering actuator and the right rear steering actuator to turn the right front wheel and the right rear wheel, respectively, in a second direction while the left front wheel and the left rear wheel are turned in the first direction; and
while the left front wheel and the left rear wheel are turned in the first direction and the right front wheel and the right rear wheel are turned in the second direction, activate the front drive motor and the rear drive motor to drive the left and right front wheels and the left and right rear wheels, respectively, in a same direction.

14. The vehicle of claim 13, further including a yaw sensor, the ECU programmed to modulate power to the front and rear drive motors based on measurements from the yaw sensor to limit rotation of the vehicle.

15. The vehicle of claim 13, further including a rear differential lock and a front differential lock, the ECU programmed to activate the front and rear differential locks prior to activating the front and rear drive motors.

16. The vehicle of claim 13, wherein the ECU is programmed to activate the left front steering actuator, the right front steering actuator, the left rear steering actuator, the right rear steering actuator, the front drive motor, and the rear drive motor in response to a request for a forward crawl operation or a reverse crawl operation from a driver.

17. The vehicle of claim 16, wherein, when the request is for the forward crawl operation, the ECU is programmed to:
activate the left front steering actuator and the left rear steering actuator to turn the left front wheel and the left rear wheel, respectively, to the right;
activate the right front steering actuator and the right rear steering actuator to turn the right front wheel and the right rear wheel, respectively, to the left; and
activate the front and rear drive motors to drive the left and right front wheels and the left and right rear wheels, respectively, in a forward direction.

18. The vehicle of claim 17, wherein, when the request is for the reverse crawl operation, the ECU is programmed to:
activate the left front steering actuator and the left rear steering actuator to turn the left front wheel and the left rear wheel, respectively, to the left;
activate the right front steering actuator and the right rear steering actuator to turn the right front wheel and the right rear wheel, respectively, to the right; and
activate the front and rear drive motors to drive the left and right front wheels and the left and right rear wheels, respectively, in a reverse direction.

19. The vehicle of claim 16, wherein the ECU is programmed to deactivate the forward crawl operation or the reverse crawl operation in response to a command from the driver.

20. The vehicle of claim 16, wherein the ECU is programmed to deactivate the left crawl operation or the right crawl operation in response to determining the vehicle has gained traction.

* * * * *